United States Patent
Kuhl

(10) Patent No.: US 11,543,045 B2
(45) Date of Patent: Jan. 3, 2023

(54) LOCKOUT SOLENOID VALVE FOR BRAKE ACTUATOR AND SYSTEM THEREOF

(71) Applicant: DEERE & COMPANY, Moline, IL (US)

(72) Inventor: Marcus L. Kuhl, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/110,885

(22) Filed: Dec. 3, 2020

(65) Prior Publication Data

US 2021/0285563 A1 Sep. 16, 2021

Related U.S. Application Data

(60) Provisional application No. 62/987,643, filed on Mar. 10, 2020.

(51) Int. Cl.
*F16K 11/07* (2006.01)
*F16K 31/06* (2006.01)
(Continued)

(52) U.S. Cl.
CPC ........ *F16K 31/0613* (2013.01); *E02F 9/2083* (2013.01); *F15B 13/0402* (2013.01); *F16K 11/0704* (2013.01); *F16K 11/0708* (2013.01)

(58) Field of Classification Search
CPC ............. F16K 31/0613; F16K 11/0708; F16K 11/0704; Y10T 137/8671; E02F 9/2083
See application file for complete search history.

(56) References Cited

U.S. PATENT DOCUMENTS 6,428,117 B1 8/2002 Messersmith
2005/0127314 A1* 6/2005 Piehl ................ F15B 13/16
137/554

(Continued)

FOREIGN PATENT DOCUMENTS

DE 102012208943 A1 12/2013
FR 2612276 A1 8/1989

OTHER PUBLICATIONS

Translation of FR2612276 (Year: 2022).*
German Search Report issued in application No. DE102021201158.6, dated Oct. 12, 2021, 6 pages.

*Primary Examiner* — Kelsey E Cary
(74) *Attorney, Agent, or Firm* — Taft Stettinius & Hollister LLP; Stephen F. Rost

(57) ABSTRACT

An electrohydraulic valve system for controlling a braking system of a work machine includes a valve body forming a bore and a fluid channel, a valve spool disposed within the bore, and a first armature positioned with respect to the valve spool to move the valve spool axially within the bore between a first position and a second position. A spring is disposed within the bore, where the valve spool is biased to its first position by the spring. A first electromagnetic coil is operably controlled between an energized state and a de-energized state, and a lockout system is formed at least partially within the valve body. The lockout system includes a second armature, a second electromagnetic coil, and a lockout spring, where the second electromagnetic coil is operably controlled between an energized state and a de-energized independently of the first electromagnetic coil.

20 Claims, 3 Drawing Sheets

(51) Int. Cl.
*E02F 9/20* (2006.01)
*F15B 13/04* (2006.01)

(56) References Cited

U.S. PATENT DOCUMENTS

| | | | | |
|---|---|---|---|---|
| 2013/0319168 A1* | 12/2013 | Pingani | ................... | F16K 31/56 |
| | | | | 74/527 |
| 2016/0239025 A1* | 8/2016 | van der Merwe | .. | F04B 43/0009 |
| 2020/0096017 A1* | 3/2020 | Becker | ................ | F16H 63/3433 |
| 2021/0317927 A1* | 10/2021 | Lindahl | ................... | F16K 11/07 |

* cited by examiner

LOCKOUT SOLENOID VALVE FOR BRAKE ACTUATOR AND SYSTEM THEREOF

RELATED APPLICATIONS

This application claims the benefit of U.S. Provisional Patent Application Ser. No. 62/987,643, filed Mar. 10, 2020 and entitled "Lockout Solenoid Valve for Brake Actuator and System Thereof," the disclosure of which is hereby incorporated by reference in its entirety.

FIELD OF THE DISCLOSURE

The present disclosure relates to a work machine, and in particular, to an electrohydraulic valve system for controlling a braking system of the work machine.

BACKGROUND

Work machines, such as an agricultural tractor or those in the agricultural industry, include a braking system for slowing or stopping the machine during operation or holding the machine stationary (e.g., a park or service brake). The braking system may include a park device control for controlling a park or service brake, for example. The braking system may include a park device control for controlling a park brake, for example. In these systems, a hydraulic valve can be electrically controlled to actuate between two or more positions to control a flow of hydraulic fluid to a brake actuator. ISO 25119 is an international standard that governs regulatory requirements of agricultural equipment, including ensuring control systems of the equipment or work machine functions correctly. Moreover, this standard sets out general principles for the design and development of safety-related parts of control systems on tractors, self-propelled ride-on machines, and other work machines in the agricultural and forestry industries. Thus, to meet the regulatory requirements of work machines, it is desirable to control the valve to prevent or reduce any errant actuation thereof during operation.

SUMMARY

In one embodiment of the present disclosure, an electrohydraulic valve system for controlling a braking system of a work machine includes a valve body forming a bore and a fluid channel; a valve spool disposed within the bore; a first armature positioned with respect to the valve spool to move the valve spool axially within the bore between a first position and a second position; a spring disposed within the bore, where the valve spool is biased to its first position by the spring; a first electromagnetic coil being operably controlled between an energized state and a de-energized state; and a lockout system formed at least partially within the valve body, the lockout system comprising a second armature, a second electromagnetic coil, and a lockout spring, where the second electromagnetic coil is operably controlled between an energized state and a de-energized independently of the first electromagnetic coil; wherein, the second armature comprises a lockout pin for releasably engaging in one of a plurality of notches formed in the first armature or valve spool; wherein, the valve spool is held in either the first position or the second position when the lockout pin is disposed within one of the plurality of notches.

In a first example, the plurality of notches is axially spaced from one another and include at least a first notch and a second notch. In a second example, the valve spool is held in the first position when the lockout pin is located in the first notch, and the valve spool is held in the second position when the lockout pin is located in the second notch. In a third example, the valve spool is held in either the first or second position when the lockout pin is located in one of the plurality of notches regardless of whether the first electromagnetic coil is in its energized state or de-energized state. In a fourth example, the lockout pin is disposed within one of the plurality of notches when the second electromagnetic coil is de-energized.

In a fifth example, the lockout pin is released from one of the plurality of notches when the second electromagnetic coil is energized. In a sixth example, the second armature compresses the lockout spring when the second electromagnetic coil is energized. In a seventh example, the lockout pin moves in a substantially transverse direction and the valve spool moves in a substantially longitudinal direction, the transverse direction being substantially perpendicular to the longitudinal direction. In an eighth example, the valve spool moves between the first position and second position only when the second electromagnetic coil is energized.

In another embodiment of the present disclosure, an electrohydraulic valve system for controlling a braking system of a work machine includes a valve body forming a bore and a port; a valve spool disposed within the bore, the valve spool including at least a first land and a second land; a first armature positioned with respect to the valve spool to move the valve spool axially within the bore between a first position and a second position; a spring disposed within the bore, where the valve spool is biased to its first position by the spring; a first electromagnetic coil being operably controlled between an energized state and a de-energized state, the first electromagnetic coil at least partially surrounding the first armature; and a lockout system formed at least partially within the valve body, the lockout system comprising a second armature, a second electromagnetic coil, and a lockout spring, where the second electromagnetic coil is operably controlled between an energized state and a de-energized independently of the first electromagnetic coil; wherein, the second armature comprises a lockout pin for releasably engaging in one of a plurality of notches formed in the first armature or valve spool; wherein, the valve spool is held in either the first position or the second position when the lockout pin is disposed within one of the plurality of notches; further wherein, the valve spool is released from the first position or second position only when the second electromagnetic coil is energized.

In one example of this embodiment, the plurality of notches comprise a first notch and a second notch, the first notch and second notch being axially spaced from one another. In a second example, the valve spool is held in the first position when the lockout pin is located in the first notch, and the valve spool is held in the second position when the lockout pin is located in the second notch. In a third example, the valve spool is held in either the first or second position when the lockout pin is located in one of the plurality of notches regardless of whether the first electromagnetic coil is in its energized state or de-energized state. In a fourth example, the lockout pin is disposed within one of the plurality of notches when the second electromagnetic coil is de-energized.

In a fifth example, the lockout pin is released from one of the plurality of notches when the second electromagnetic coil is energized. In a sixth example, the second armature compresses the lockout spring when the second electromagnetic coil is energized. In a seventh example, the lockout pin moves in a substantially transverse direction and the valve spool moves in a substantially longitudinal direction, the transverse direction being substantially perpendicular to the longitudinal direction.

In a further embodiment, an electrohydraulic control system for controlling a braking system of a work machine includes a controller; a source of hydraulic fluid; a brake actuator configured for moving between an engaged and disengaged position; a valve body forming a bore and a port, the port being fluidly coupled to the bore and the brake actuator; a valve spool disposed within the bore and in fluid communication with the port; a first armature positioned with respect to the valve spool to move the valve spool axially within the bore between a first position and a second position; a spring disposed within the bore, where the valve spool is biased to its first position by the spring; a first electromagnetic coil being operably controlled between an energized state and a de-energized state, the first electromagnetic coil at least partially surrounding the first armature; and a lockout system formed at least partially within the valve body, the lockout system comprising a second armature, a second electromagnetic coil, and a lockout spring, where the second electromagnetic coil is operably controlled between an energized state and a de-energized independently of the first electromagnetic coil; wherein, the second armature comprises a lockout pin for releasably engaging in one of a plurality of notches formed in the first armature or valve spool; wherein, the valve spool is held in either the first position or the second position when the lockout pin is disposed within one of the plurality of notches; further wherein, the valve spool is released from the first position or second position only when the second electromagnetic coil is energized.

In one example of this embodiment, in the first position, the valve spool blocks fluid communication between the source and the port; and in the second position, the valve spool allows fluid communication between the source and the port. In another example, the valve spool is held in either the first or second position when the lockout pin is located in one of the plurality of notches regardless of whether the first electromagnetic coil is in its energized state or de-energized state; the lockout pin is disposed within one of the plurality of notches when the second electromagnetic coil is de-energized; and the lockout pin is released from one of the plurality of notches when the second electromagnetic coil is energized.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
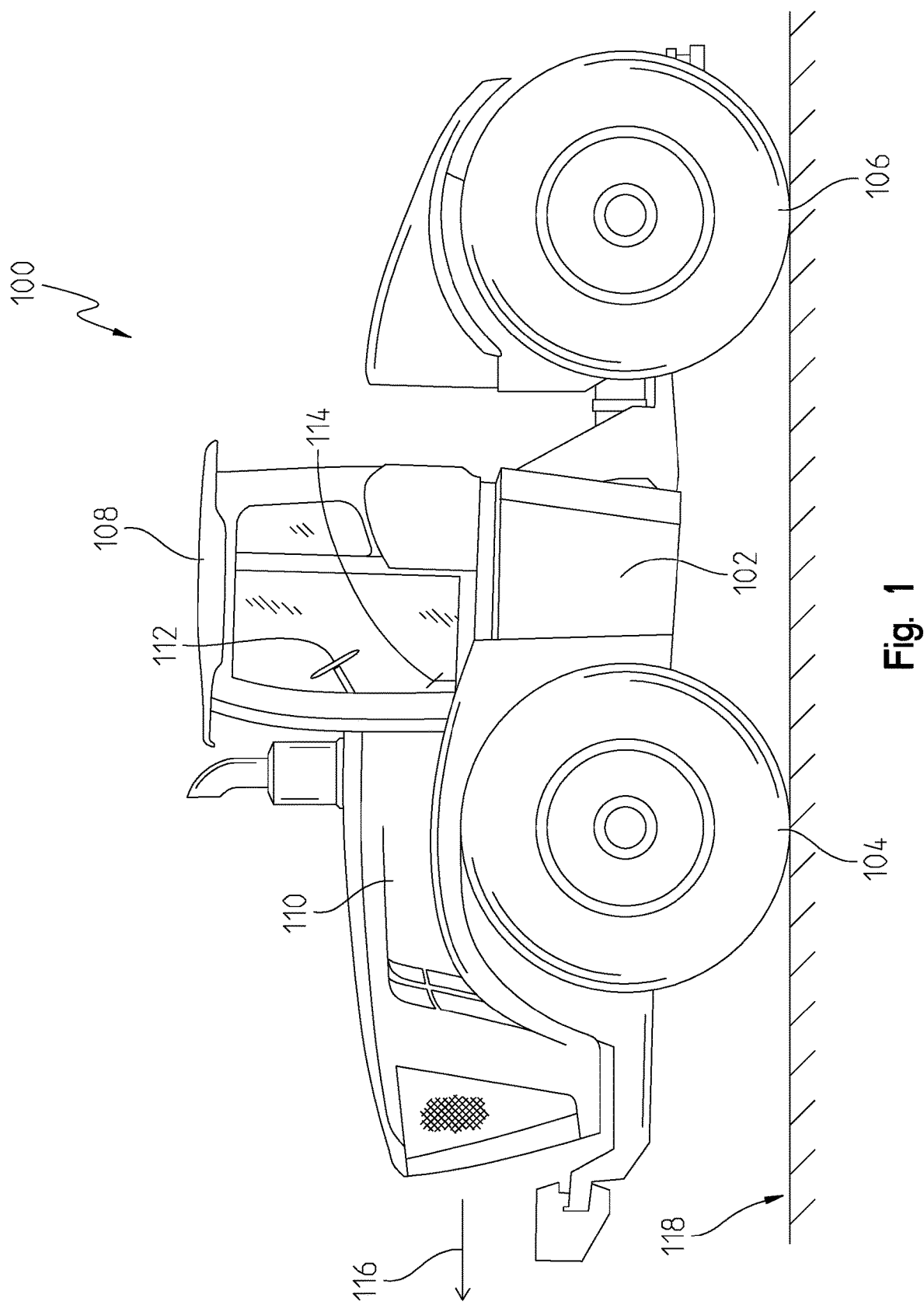
FIG. 1 is a side view of a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An exemplary embodiment of a work machine is shown in FIG. 1. The machine is embodied as a tractor 100, but the present disclosure is not limited to a tractor and may extend to other work machines in the agricultural, construction, and forestry industries. As such, while the figures and forthcoming description may relate to a tractor, it is to be understood that the scope of the present disclosure extends beyond a tractor and, where applicable, the term "machine" or "work machine" will be used instead. The term "machine" or "work machine" is intended to be broader and encompass other vehicles besides a tractor for purposes of this disclosure.

Referring to FIG. 1, the machine 100 includes a chassis 102 or frame. The chassis 102 can be supported on the ground 118 by a plurality of ground-engaging mechanisms. In FIG. 1, the plurality of ground-engaging mechanisms includes one or more front wheels 104 and one or more rear wheels 106. In an alternative embodiment, the plurality of ground-engaging mechanisms may include tracks for moving the machine 100 along the ground 118.

The chassis 102 includes a cab 108 in which the machine operator controls the machine. The cab 108 can include a control system including, but not limited to, a steering wheel 112, a control level, a joystick, control pedals, or control buttons. The operator can actuate one or more controls of the control system for purposes of operating the machine 100. In this illustrated embodiment, a control lever 114 is shown in the cab 108 for actuating a braking system (not shown) of the machine 100. Alternatively, the control lever 114 may comprise a pedal, button, or knob. When actuated or engaged, the braking system may slow or reduce a speed of the machine. When released, the braking system is not active and the machine is able to traverse in a forward travel direction 116 or in an opposite, reverse direction.

The work machine 100 may include an engine compartment 110 for housing an engine or other power-generating device. Although not shown, a transmission, cooling system, and the like may also be located in or near the engine compartment 110.

Figure 2:
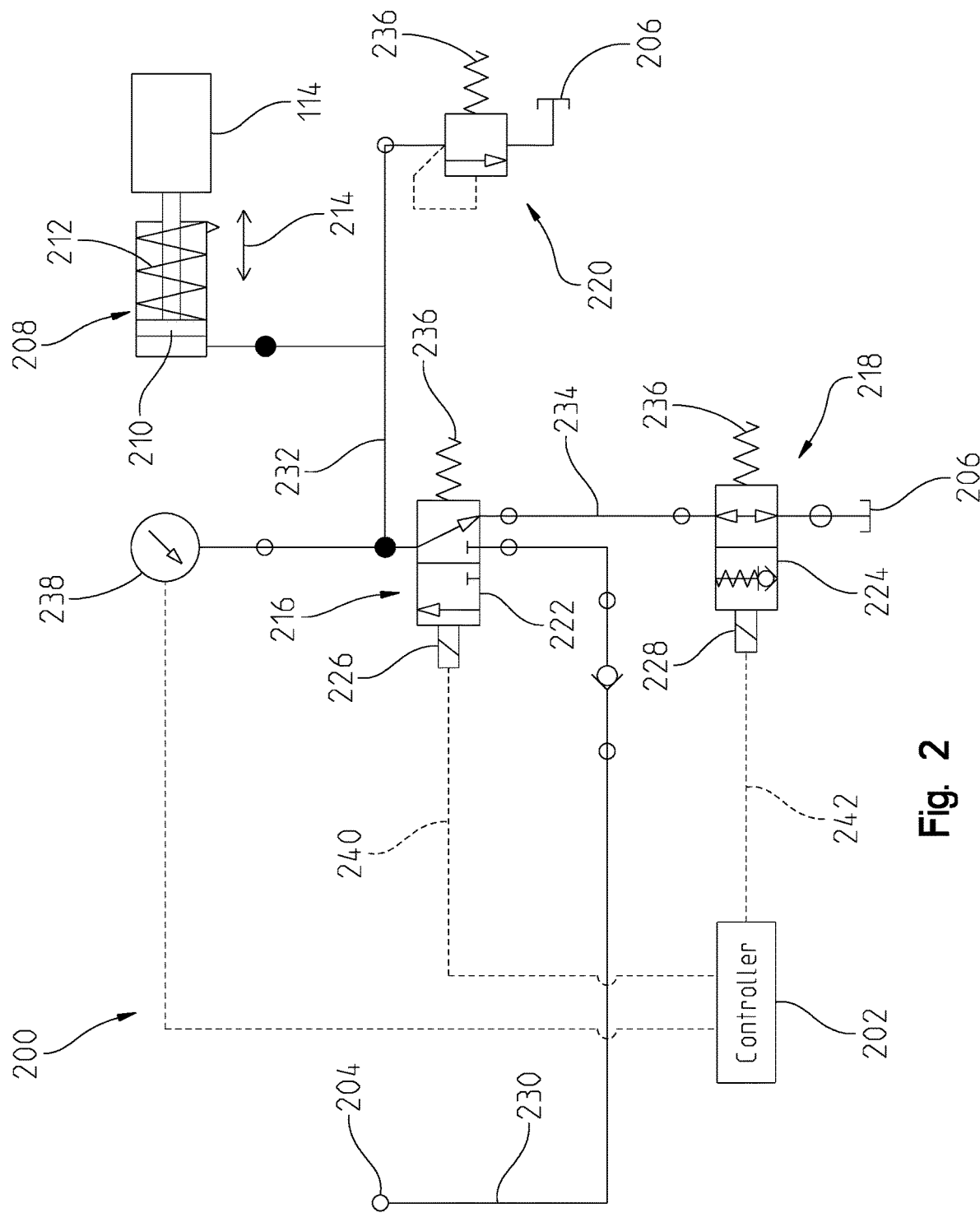
FIG. 2 is a schematic of a control system for controlling actuation of a brake actuator of the work machine of FIG. 1.

Referring now to FIG. 2, a control system 200 is shown for engaging or releasing the braking system of the work machine. In this embodiment, a controller 202 may be provided for electrically controlling the work machine 100. The controller 202 may be a machine controller for controlling the operation of the work machine, or it may be part of a larger control system that includes two or more controllers. The controller 202 may be an engine controller, a transmission controller, a brake controller, or any other type of controller.

In the embodiment, the control system 200 is designed as an electrohydraulic control system for controller the braking system. Here, a pressure source 204 may include a tank or reservoir of hydraulic fluid. The pressure source 204 may be fluidly coupled to a sump or reservoir 206 where fluid may be leaked or dumped during machine operation.

The braking system may include a brake actuator 208 for engaging or disengaging a brake or a pawl (i.e., a park brake). The brake actuator 208 may include a piston 210 and return spring 212. The piston 210 may be biased by the spring in a first direction and fluidly applied such that it moves in an opposite, second direction. As such, the piston 212 can move in an actuation direction 214 based on a difference between the amount of fluid pressure being applied to one side of the piston 212 and the spring force applied by the return spring 212 to an opposite side thereof.

The control system 200 may also include a plurality of valves. For instance, a supply electrohydraulic solenoid valve assembly 216 ("supply valve"), a sump block electrohydraulic solenoid valve assembly 218 ("sump block valve"), and a relief valve 220 may be located in the system 200. The supply valve 216 may include a spool valve 222 which may be actuated when a solenoid 226 is energized and forces the spool valve 222 to compress a spring 236. When the solenoid 226 is de-energized, the spring 236 can decompress and move the spool valve 222 in an opposite direction.

The sump block valve 218 may include a spool valve 224 which may also be actuated when another solenoid 228 is energized and forces the spool valve 224 to compress a spring 236. When the solenoid 228 is de-energized, the spring 236 can decompress and move the spool valve 224 in an opposite direction. As shown, the relief valve 220 may be actuated when extra fluid in the system flows and forces the valve 220 to compress a spring 236. When the pressure is reduced, the spring 236 may return the valve 220 to its unapplied state.

The control system 200 is arranged such that fluid from the pressure source 204 may flow through a main circuit line 230, and depending upon the state or position of the supply valve 224, fluid may be blocked or allowed to flow to the actuator 208. In this embodiment, the brake actuator 208 may be applied when there is no or little fluid flowing to the actuator 208. In this manner, the brake actuator is applied by the spring 212. To disengage the brake actuator 208, the supply valve 216 may be actuated to thereby open fluid flow from the main circuit line 230 to a second line 232 that feeds directly to the brake actuator 208. A third line 234 fluidly couples the supply valve 216 and the sump block valve 218. As hydraulic fluid builds in the second line 232, the amount of force applied to the brake actuator 208 may exceed the spring force thereby causing the brake actuator to disengage or release.

The controller 202 may be in electrical communication with a pressure sensor 238, as shown. The pressure sensor 238 may detect the amount of fluid pressure in the second line 238 and communicate the same to the controller 202. In this way, the controller 202 may be able to determine whether the brake actuator 208 is engaged or disengaged based on the amount of fluid pressure detected by the pressure sensor 238.

The controller 202 is also able to control actuation of the supply valve 216 and sump block valve 218. In particular, the controller 202 may be in electrical communication with the solenoids 226, 228 to energize or de-energize each, thereby controlling the movement of each valve. In this manner, the controller 202 may include control logic stored within a memory unit or the like which is executed by a processor to control the electrical state of each solenoid. The controller 202 may be in communication, for example, with the control lever 114 when an operator sends a command to either engage or disengage the braking system. Upon receiving this command from the control lever 114, the controller 202 may control the solenoids 226, 228 to reach the desired state commanded by the operator.

Braking systems, particularly park brake circuits with electrohydraulically actuated park brakes and park pawls, are often used in tractors and other agricultural machines. The parking brake system of a work machine is designed to provide a level of safety with built in redundancy to ensure that if there is an error in the system or control logic, the parking brake does not engage or disengage in unsafe or undesirable circumstances. As described above, ISO 25119 is a regulatory requirement that evaluates electronic control of braking systems such that if an error does arise in the control logic, the braking system does not act in an undesirable way.

In the braking system 200 of FIG. 2, hydraulic fluid is directed from the source 204 to the hydraulic actuator 208 in order to disengage the brake. As described above, this is done by actuating the supply valve 216 and the sump block valve 218 to open a flow path between the source 204 and the actuator 208. The sump block valve 218 generally is designed to have low leakage. Thus, if there is a loss of fluid or leakage of fluid past the supply valve 216, fluid pressure on the actuator 208 may slowly decrease but the actuator will remain disengaged so long as the sump block valve 218 remains actuated.

An issue, however, can arise if the control logic or current sent to the solenoid 226 of the sump block valve 216 or the solenoid 228 of the sump block valve 218 is erroneously lost or discontinued when the brake actuator 208 is disengaged, the park brake may be accidentally engaged due to a leakage of oil or a direct flow path opening up between the source and brake actuator 208. It can further be undesirable for either valve to be actuated on when the brake actuator is engaged, as hydraulic fluid may flow to the hydraulic actuator 208 and apply it. In each situation, the brake actuator 208 may be undesirably engaged or disengaged against the intention of the operator.

In the present disclosure, one or more embodiments are disclosed which may provide necessary redundancy to braking systems such as the one shown in FIG. 2. In particular, each embodiment may include two or more electromagnetic coils disposed in electrical communication with a controller such that the controller communicates independently with each coil to actuate a valve. In this system, each coil is either energized or de-energized by the controller before a valve changes state. Thus, if there is an error in the control logic and both coils are not energized or de-energized, then the valve does not change state.

When electrically actuated, each coil creates a magnetic field which results in a force being exerted on the armature. At least one armature may be mechanically coupled to a valve spool, which moves in a longitudinal direction within a valve casting or housing to divert hydraulic fluid between ports. Another armature may function to lock out or prevent the valve spool from moving in any direction within the valve casting or housing. As such, this built in redundancy is better able to protect the braking system and work machine from errors in control logic that can otherwise result in undesirable engagement or disengagement of the braking system.

Figure 3:
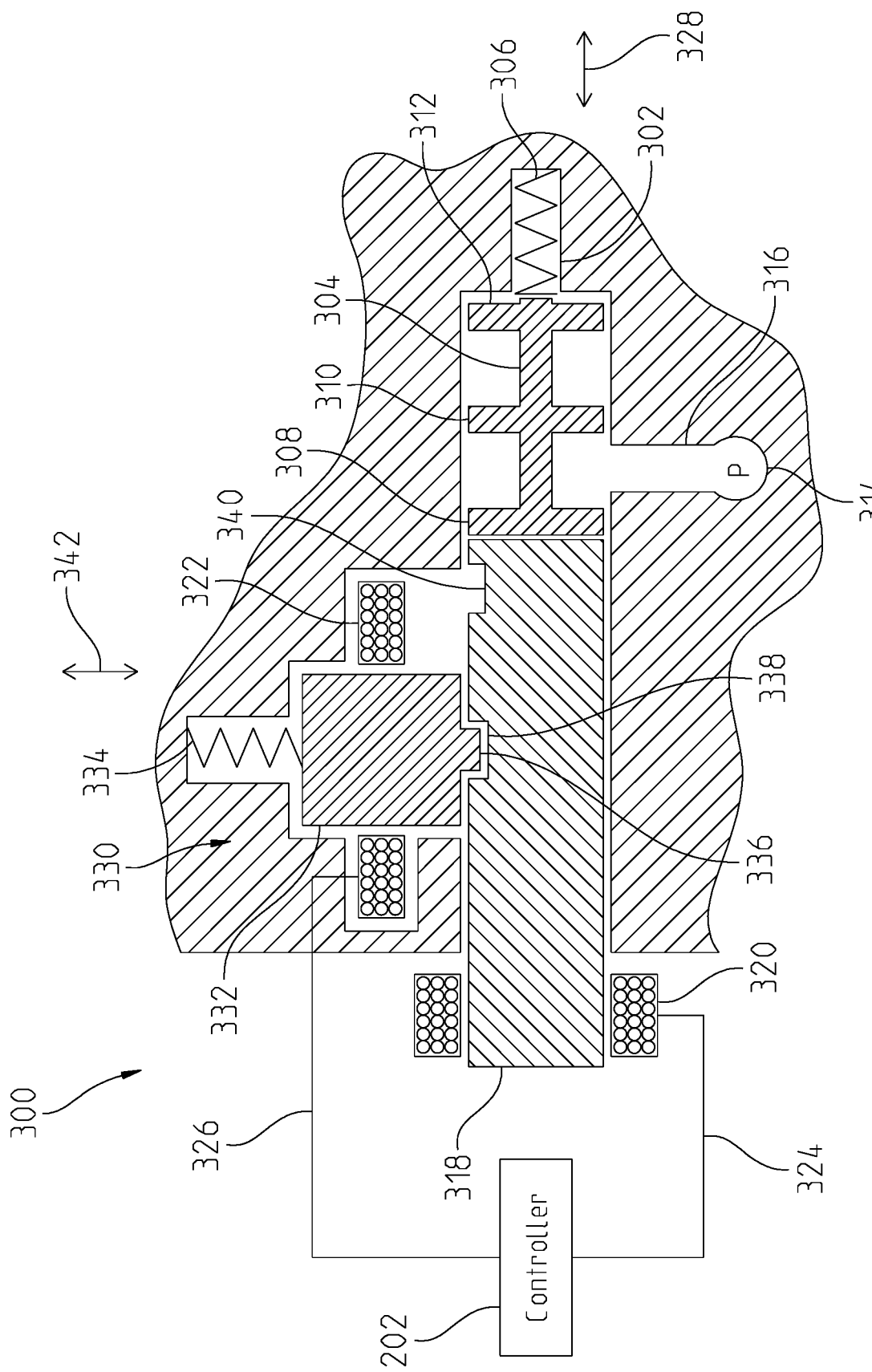
FIG. 3 is a schematic of an embodiment of an electrohydraulic valve for controlling actuation of a braking system on a work machine.

Referring to FIG. 3, an embodiment of an electrohydraulic valve system 300 for a braking system of a work machine is illustrated. The valve system 300 may be either or both the supply valve 216 or sump block valve 218 in the system 200 of FIG. 2. As shown, the valve system 300 may include a valve body 302, cast body or housing. A spool valve 304 is located within a bore of the valve body 302 and may be actuated in an axial or longitudinal direction 328 in order to divert hydraulic fluid into a flow passage 316 fluidly coupled to a brake actuator port 314. The brake actuator port 314 may be in fluid communication with the brake actuator 208 of FIG. 2, and as such the flow passage 316 may correspond with the second line 232 described above.

The spool valve 304 may comprise a body having a first end and a second end, where the body further includes a plurality of valve lands between the first and second ends. As shown, the valve 304 may include a first land 308 located at a first end, a second land 310, and a third land 312. The third land 312 may be located at the second end of the valve spool 304, with the second land 310 located between the first and second lands.

A valve spool or return spring 306 may also be located in the valve body 302 such that the spring 306 exerts a spring force against the valve spool 304. To counteract the spring force, the valve system 300 may include a first armature 318 having magnetic properties. The first armature 318 may include a pin (not shown) or other structure which mechanically acts on the valve spool 304. In the embodiment of FIG. 3, the armature 318 is at least partially surrounded by a first electromagnetic coil 320.

The first electromagnetic coil is in electrical communication via a first communication link 324 with a controller 202. The controller 202 may include control logic to determine when to energize or de-energize the first electromagnetic coil 320.

The valve system 300 of FIG. 3 may also include a lockout system 330. The lockout system 300 may include a second armature 332 and a lockout spring 334 positioned within a bore of the valve body 302. In particular, the second armature 332 and lockout spring 334 may be arranged substantially perpendicular to the valve spool 304. The lockout spring 334 may bias the second armature 332 to engage with the first armature 318 or valve spool 304. As shown, the second armature 332 may include a lockout pin 336 disposed at an end opposite of where the lockout spring 334 contacts the second armature 332. The lockout pin 336 is configured to engage with one of a plurality of notches formed in the first armature 318 or valve spool 304. In FIG. 3, the first armature 318 is shown including a first notch 338 or pin seat and a second notch 340 or pin seat. In an alternative embodiment, the valve spool 304 may include the plurality of notches to be engaged by the lockout pin 336.

A second electromagnetic coil 322 may also be part of the lockout system 330. As shown, the second armature 332 is at least partially surrounded by a second electromagnetic coil 322. The second electromagnetic coil 322 may be in electrical communication via a second communication link 326 with the controller 202. The controller 202 may include control logic to send current or an electrical signal to energize the second electromagnetic coil 322 and induce movement of the second armature 332 and lockout pin 336.

During operation, the second electromagnetic coil 322 may be energized in order to induce movement of the second armature 332 and lockout pin 336 in a direction 342 to compress the lockout spring 334. This direction 342 may be substantially transverse or perpendicular to the axial direction 328 in which the valve spool 304 moves.

The controller 202 may communicate independently with the first and second electromagnetic coils. For example, the controller 202 may be in communication with the first coil 320 via the first communication link 324 and with the second coil 322 via the second communication link 326. Thus, if a signal is communicated to the first coil 320 over the first communication link 324, it is not received by the second coil 322, and vice versa. In other words, the second coil 322 is not in communication with the first communication link 324, and the first coil 320 is not in communication with the second communication link 326. As a result, any erroneous signal over either communication link is not received by both coils and thereby does not cause erroneous engagement or disengagement of the brake actuator 208.

Moreover, a current or electrical signal may be communicated by the controller 202 to each coil. Upon receiving the current or signal, the coil is energized and forms a magnetic field which can result in a force being exerted on the respective armature. As described above, the first armature 318 may be mechanically coupled to the valve spool 304, which moves longitudinally or axially 328 within the valve body 302 to divert hydraulic fluid between different ports including the brake actuator port 314. While only one port 314 is shown in FIG. 3, it is understood that there may be a plurality of ports fluidly coupled to the valve spool 304. For example, one port may be fluidly coupled to the pressure source 204 of FIG. 2. Thus, movement of the valve spool 304 from the first position to the second position may fluidly couple the pressure source 204 to the brake actuator port 314.

In FIG. 3, the redundancy of the valve system 300 is provided by the combination of the first electromagnetic coil 320 and the lockout system 330. In particular, in FIG. 3 the valve spool 304 is disposed in its second position to allow hydraulic fluid to flow into the brake actuator port 314 between the first land 308 and second land 310. The first electromagnetic coil 320 is energized by the controller 202 in order to move the valve spool 304 axially to its second position. The lockout pin 336 is located in the first notch 338, and so long as the lockout pin 336 is in this position, neither the spring 306 nor the first electromagnetic coil 320 can cause the valve spool 304 to move. In other words, the valve spool 304 is "locked out" by the lockout system 330.

Once the lockout pin 336 is located in one of the plurality of notches, the controller 202 may de-energize the second electromagnetic coil 322 without the valve spool 304 shifting states. The engagement between the lockout pin 336 and notch effectively hold or lock the valve spool in its current state.

When it is desired to shift the valve spool, the controller 202 may first send a signal via the second communication link 326 to energize the second electromagnetic coil 322. In doing so, this induces the second armature 332 to move transversely 342 and compress the lockout spring 334. As this happens, the lockout pin 336 disengages from the notch. In the example shown in FIG. 3, the lockout pin 336 moves away from and out of engagement with the first notch 338.

As the lockout pin 336 disengages from the first notch 338, the valve spool 304 remains in its second position so long as the first electromagnetic coil 320 is energized by the controller 202. This is because the net force exerted by the first electromagnetic coil 320 is greater than the spring force exerted by the spring 306. However, when the controller 202 de-energizes the first electromagnetic coil 320, the spring 306 is able to actuate the valve spool 304 to its first position. As this happens, the controller 202 may de-energize the second electromagnetic coil 322 which allows the lockout spring 334 to decompress and move the lockout pin 336 into engagement with the second notch 340. Once the lockout pin 336 is engaged with the second notch 340, the valve spool 304 is again "locked" in the first position. Further, once the lockout system 330 holds the valve spool 304 in the first position, the first electromagnetic coil 320 is unable to unlock and actuate the valve spool 304 until the second electromagnetic coil 322 is energized.

As described above, each of the electromagnetic coils is independently energized by the controller 202. When the controller 202 sends current or an electrical signal via the first communication link 324 and the second communication link 326 to energize the first and second coils, respectively, the lockout pin 336 disengages from one of the notches and thereby releases the valve spool 304 for movement. Once the first electromagnetic coil 320 is energized, a resulting net force by the coil 320 is greater than the spring force of the valve spool spring 306. Thus, the first armature 318 can actuate the valve spool 304 to compress the valve spool spring 306 and move from a first position to a second position. As the spring 306 is compressed, the flow channel 316 may be opened to allow fluid to flow into the hydraulic actuator port 314. As a result, hydraulic fluid may apply the brake actuator 208 and release the brake. Further, with the valve spool 304 in the second position, the controller 202 may de-energize the second electromagnetic coil 322 such that the lockout pin 336 engages with the first notch 338. This holds or locks the valve spool 304 in its second position.

When it is desirable to engage the brake, i.e., an operator of the work machine actuates a brake lever 114 or otherwise commands the controller 202 to engage the brake, the controller 202 first releases the lockout system 330. Here, the controller 202 may sense movement of the lever 114 indicative of an operator's desire to engage the brake, and then the controller 202 sends a command via the second communication link 326 to energize the second electromagnetic coil 32. Once energized, the second armature 332 and lockout pin 336 move transversely 342 and compress the lockout spring 334. The valve spool 304 is now unlocked and free to be actuated, as desired.

While the second electromagnetic coil 322 is energized, the controller 202 may de-energize the first electromagnetic coil 320 by discontinuing any electrical current via the first communication link 324. As this happens, the net force by the spring 306 exceeds any opposing force on the valve spool 304 and actuates the valve spool 304 to move from its second position to its first position. Once this happens, the controller 202 may de-energize the second electromagnetic coil 322 which allows the lockout spring 334 to decompress and move the lockout pin 336 into engagement with the second notch 340. Consequently, a fluid connection between the pressure source 204 and the brake actuator port 314 is blocked by one of the valve lands of the valve spool 304. Thus, the brake actuator 208 may be hydraulically released allowing for the engagement of the brake.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An electrohydraulic valve system for controlling a braking system of a work machine, comprising:
   a controller;
   a valve body forming a bore and a fluid channel;
   a valve spool disposed within the bore;
   a first armature positioned with respect to the valve spool to move the valve spool axially within the bore between a first position and a second position;
   a spring disposed within the bore, where the valve spool is biased to its first position by the spring;
   a first electromagnetic coil being operably controlled between an energized state and a de-energized state;
   a lockout system formed at least partially within the valve body, the lockout system comprising a second armature, a second electromagnetic coil, and a lockout spring, where the second electromagnetic coil is operably controlled via the controller between an energized state and a de-energized state independently of the first electromagnetic coil;
   wherein, the second armature comprises a lockout pin for releasably engaging in one of a plurality of notches formed in the first armature;
   wherein, the plurality of notches comprises at least a first notch and a second notch;
   wherein, the valve spool is held in either the first position or the second position when the lockout pin is disposed within one of the plurality of notches.

2. The system of claim 1, wherein the plurality of notches is axially spaced from one another.

3. The system of claim 2, wherein the valve spool is held in the first position when the lockout pin is located in the first notch, and the valve spool is held in the second position when the lockout pin is located in the second notch.

4. The system of claim 1, wherein the valve spool is held in either the first or second position when the lockout pin is located in one of the plurality of notches regardless of whether the first electromagnetic coil is in its energized state or de-energized state.

5. The system of claim 1, wherein the lockout pin is disposed within one of the plurality of notches when the second electromagnetic coil is de-energized.

6. The system of claim 1, wherein the lockout pin is released from one of the plurality of notches when the second electromagnetic coil is energized.

7. The system of claim 6, wherein the second armature compresses the lockout spring when the second electromagnetic coil is energized.

8. The system of claim 1, wherein the lockout pin moves in a substantially transverse direction and the valve spool moves in a substantially longitudinal direction, the transverse direction being substantially perpendicular to the longitudinal direction.

9. The system of claim 1, wherein the valve spool moves between the first position and second position only when the second electromagnetic coil is energized.

10. An electrohydraulic valve system for controlling a braking system of a work machine, comprising:
    a controller;
    a valve body forming a bore and a port;
    a valve spool disposed within the bore, the valve spool including at least a first land and a second land;
    a first armature positioned with respect to the valve spool to contact and move the valve spool axially within the bore between a first position and a second position, the first armature not being coupled to the valve spool;
    a spring disposed within the bore, where the valve spool is biased to its first position by the spring;
    a first electromagnetic coil being operably controlled between an energized state and a de-energized state, the first electromagnetic coil at least partially surrounding the first armature;
    a lockout system formed at least partially within the valve body, the lockout system comprising a second armature, a second electromagnetic coil, and a lockout spring, where the second electromagnetic coil is operably controlled between an energized state and a de-energized state independently of the first electromagnetic coil;

a first communication link defined between the controller and the first electromagnetic coil for electrically energizing or de-energizing the first electromagnetic coil; and a second communication link defined between the controller and the second electromagnetic coil for electrically energizing or de-energizing the second electromagnetic coil;

wherein, the first communication link is independent from the second communication link to avoid miscommunication between the controller and the respective first and second electromagnetic coils;

wherein, the second armature comprises a lockout pin for releasably engaging in one of a plurality of notches formed in the first armature;

wherein, the valve spool is held in either the first position or the second position when the lockout pin is disposed within one of the plurality of notches;

further wherein, the valve spool is released from the first position or second position only when the second electromagnetic coil is energized.

11. The system of claim 10, wherein the plurality of notches comprise a first notch and a second notch, the first notch and second notch being axially spaced from one another.

12. The system of claim 11, wherein the valve spool is held in the first position when the lockout pin is located in the first notch, and the valve spool is held in the second position when the lockout pin is located in the second notch.

13. The system of claim 11, wherein the valve spool is held in either the first or second position when the lockout pin is located in one of the plurality of notches regardless of whether the first electromagnetic coil is in its energized state or de-energized state.

14. The system of claim 10, wherein the lockout pin is disposed within one of the plurality of notches when the second electromagnetic coil is de-energized.

15. The system of claim 10, wherein the lockout pin is released from one of the plurality of notches when the second electromagnetic coil is energized.

16. The system of claim 15, wherein the second armature compresses the lockout spring when the second electromagnetic coil is energized.

17. The system of claim 10, wherein the lockout pin moves in a substantially transverse direction and the valve spool moves in a substantially longitudinal direction, the transverse direction being substantially perpendicular to the longitudinal direction.

18. An electrohydraulic control system for controlling a braking system of a work machine, comprising:
a controller;
a source of hydraulic fluid;
a brake actuator configured for moving between an engaged and disengaged position;
a valve body forming a bore and a port, the port being fluidly coupled to the bore and the brake actuator;
a valve spool disposed within the bore and in fluid communication with the port;
a first armature positioned with respect to the valve spool to move the valve spool axially within the bore between a first position and a second position, the first armature being coupled to the valve spool;
a spring disposed within the bore, where the valve spool is biased to its first position by the spring;
a first electromagnetic coil being operably controlled between an energized state and a de-energized state, the first electromagnetic coil at least partially surrounding the first armature;
a lockout system formed at least partially within the valve body, the lockout system comprising a second armature, a second electromagnetic coil, and a lockout spring, where the second electromagnetic coil is operably controlled between an energized state and a de-energized state independently of the first electromagnetic coil;
a first communication link defined between the controller and the first electromagnetic coil for electrically energizing or de-energizing the first electromagnetic coil; and
a second communication link defined between the controller and the second electromagnetic coil for electrically energizing or de-energizing the second electromagnetic coil;
wherein, the first communication link is independent from the second communication link to avoid miscommunication between the controller and the respective first and second electromagnetic coils;
wherein, the second armature comprises a lockout pin for releasably engaging in one of a plurality of notches formed in the first armature;
wherein the plurality of notches comprises a first notch and a second notch;
wherein, the valve spool is held in either the first position or the second position when the lockout pin is disposed within one of the plurality of notches;
further wherein, the valve spool is released from the first position or second position only when the second electromagnetic coil is energized.

19. The system of claim 18, wherein:
in the first position, the valve spool blocks fluid communication between the source and the port; and
in the second position, the valve spool allows fluid communication between the source and the port.

20. The system of claim 18, wherein:
the valve spool is held in either the first or second position when the lockout pin is located in one of the plurality of notches regardless of whether the first electromagnetic coil is in its energized state or de-energized state;
the lockout pin is disposed within one of the plurality of notches when the second electromagnetic coil is de-energized; and
the lockout pin is released from one of the plurality of notches when the second electromagnetic coil is energized.

* * * * *